Aug. 17, 1937.   D. H. MONTGOMERY ET AL   2,090,262
AUTOMATIC CONTROL MEANS FOR MACHINE TOOLS
Original Filed Sept. 15, 1933   2 Sheets-Sheet 1
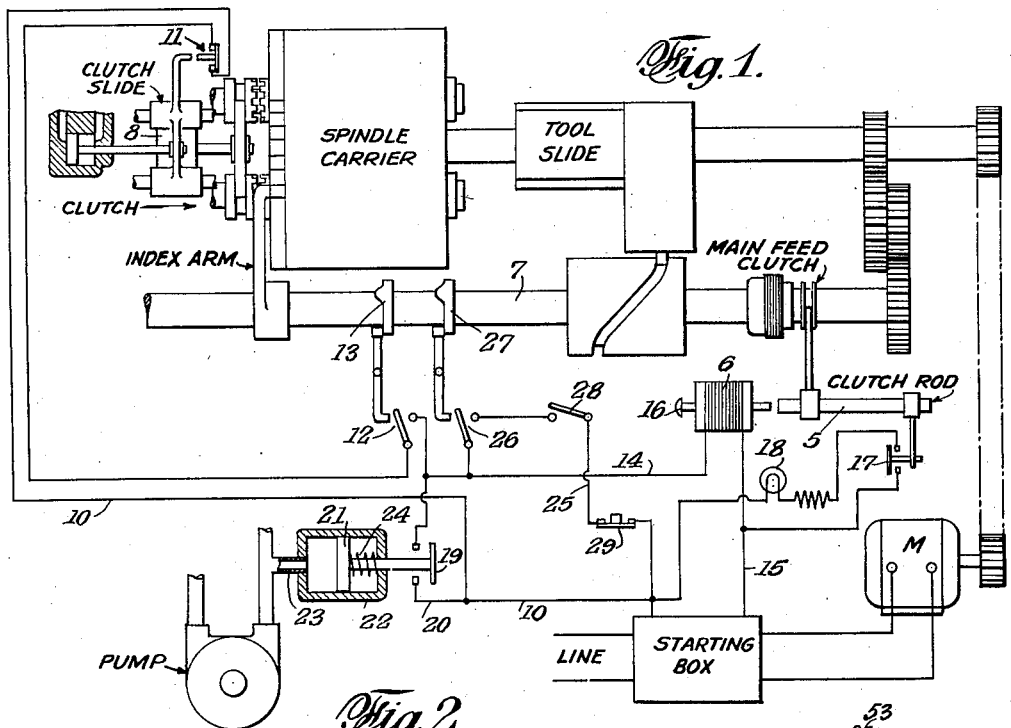
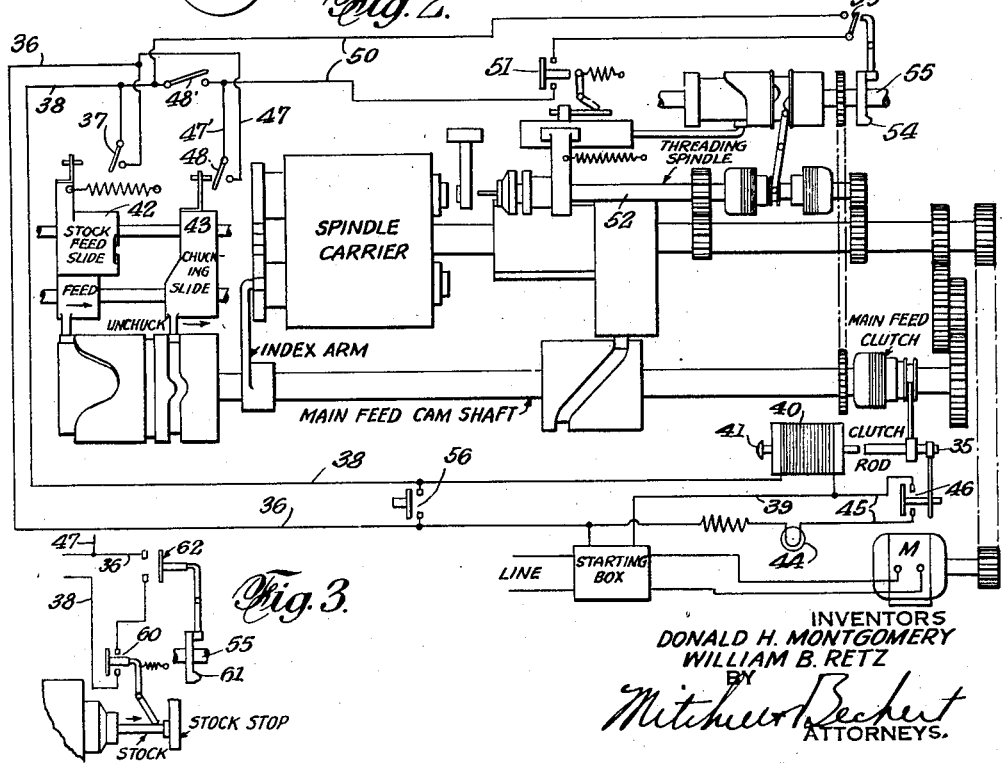
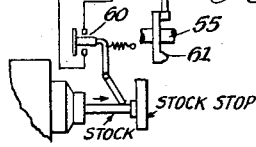
INVENTORS
DONALD H. MONTGOMERY
WILLIAM B. RETZ
BY
ATTORNEYS.

Aug. 17, 1937.   D. H. MONTGOMERY ET AL   2,090,262
AUTOMATIC CONTROL MEANS FOR MACHINE TOOLS
Original Filed Sept. 15, 1933   2 Sheets-Sheet 2
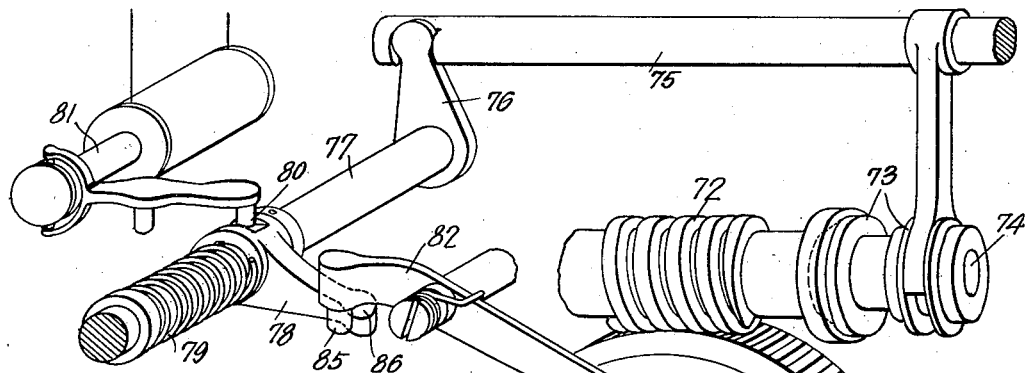
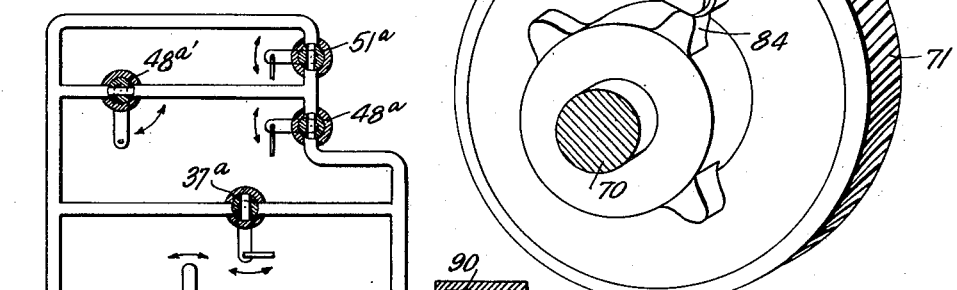
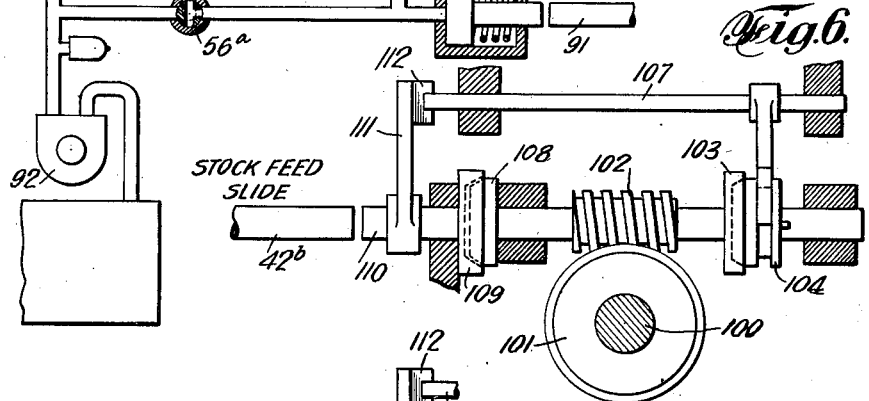
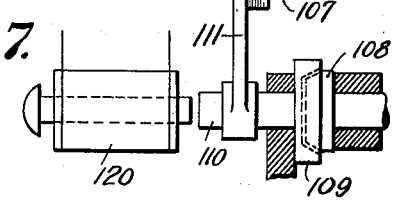
Donald H. Montgomery
William B. Retz   INVENTORS
BY
*Mitchell Bechert*
ATTORNEYS Patented Aug. 17, 1937

2,090,262

UNITED STATES PATENT OFFICE 2,090,262

AUTOMATIC CONTROL MEANS FOR MACHINE TOOLS

Donald H. Montgomery, Hartford, and William B. Retz, Plainville, Conn., assignors, by mesne assignments, to The New Britain Machine Company, New Britain, Conn., a corporation of Connecticut Application September 15, 1933, Serial No. 689,596
Renewed January 16, 1937

13 Claims. (Cl. 29—37)

Our invention relates to a machine, such as a screw machine, chucking machine and the like, and more particularly to certain automatic or semi-automatic devices for stopping the machine or the feed works under certain conditions.

It is an object of the invention to provide a machine of the character indicated with novel means for stopping the machine or the machine feed upon a failure of a bar of stock to be fed properly.

It is another object to provide automatic means in an indexing type of machine to stop the machine or the indexing functions thereof upon a failure of a proper draw back of a tool or tools.

It is another object to provide a machine of the character indicated with means which may be set manually at any time so arranged as to cause the machine to be thereafter automatically stopped at a predetermined point in the cycle of the machine.

A more specific object is to provide means for automatically stopping the machine at a predetermined point in its cycle with a chuck in open position.

Another object is to provide a machine of the character indicated having a rotatable spindle and provided with means for stopping the machine or the feed functions thereof upon a failure of the spindle to be properly actuated.

It is still another object to provide a machine of the character indicated having a fluid pressure switch for controlling a main feed clutch or the like.

Finally, a more general object of the invention is to provide a machine of the character indicated with means for stopping the machine or certain functional parts thereof upon a failure of the machine to function normally.

Other objects and features of invention and advantage will either be hereinafter pointed out or will become apparent upon a reading of the specification in connection with the illustrative diagrammatic drawings.

Various illustrative features of the invention will be described in connection with a bar machine and a chucking machine which may be of conventional or any desired type, for example, of the type disclosed in application, Serial No. 551,136, filed July 16, 1931.

In a standard multiple spindle bar machine there is an indexible spindle carrier for rotatable spindles which carry chucks. The stock is operated on by forming tools usually on slides or by end working tools, or by both. The feed functions of the machine are usually controlled by a feed clutch so that the spindle drive may be continuous and the feed works may be thrown in or out as desired. The stock is chucked, unchucked, and fed usually by means actuated by a chucking slide and a feed slide.

A chucking machine may be the same or similar to the bar machine except that individual work pieces or blanks rather than bar stock are employed, and the rotation of the spindle in loading position is usually interrupted to facilitate loading.

The general features of a bar machine and a chucking machine heretofore mentioned are well known generally in the art and illustration thereof has been omitted, since it is believed that the invention will be clearly understandable to those skilled in the art from a description of the illustrative diagrammatic drawings. Furthermore, certain features of the invention are applicable to many other types of machines, but, for convenience, will be described as embodied in machines as above described.

In the drawings which show, for illustrative purposes only, and diagrammatically, preferred features of the invention—

Fig. 1 is a diagrammatic view of parts of an automatic chucking machine of the work rotating type and illustrating features of the invention;

Fig. 2 is a view similar to Fig. 1 but illustrating the application of the invention to a bar machine;

Fig. 3 is a fragmentary view of Fig. 2, illustrating the actuation of a control member by the stock instead of the feed slide as in Fig. 2;

Fig. 4 is an isometric view of a modified form of machine control involving a mechanically actuated drive connection;

Fig. 5 is a diagrammatic view of an automatic machine control actuated by fluid pressure;

Fig. 6 is a diagrammatic view of a machine control wholly mechanically actuated;

Fig. 7 is a fragmentary view of Fig. 6 and illustrating an electrical control.

Referring first to Fig. 1, it will be seen that the machine is driven by the electric motor M. The motor, through the usual or any suitable gearing, drives one or more spindles, and likewise through gearing drives the feed and index mechanism. The latter mechanism may be controlled by a main feed clutch actuated by a clutch rod 5. This clutch rod may be thrown in the clutch-engaging direction, that is, toward the left as viewed in Fig. 1, as well as in the clutch-disengaging direction, that is, toward the right, by a manual handle. The clutch rod 5 when in the left-hand position, that is, with the main feed clutch engaged, may, under certain conditions, be moved toward the right by means of an automatically actuated device, such as a solenoid 6. The machine may embody a cam shaft 7 for controlling the feed functions of the machine as well as the indexing mechanism and clutch slide 8 and the like. A spindle carrier may carry a plurality of rotatable spindles having chucks thereon, which may be manually or automatically actuated, as desired. Each spindle may be associated with means for stopping and starting the rotation thereof, which means we shall refer to broadly as the clutch slide 8, since such spindle starting and stopping mechanism usually involves a clutch for clutching and unclutching the spindle and its drive gear.

In the preferred form shown there is a circuit line 10 from the starting box which circuit line has therein a normally closed switch 11 in position to be actuated directly or otherwise controlled by the clutch slide 8. This line has another switch 12 in series with the switch 11 and is normally open, but is closed at a predetermined point in the cycle of the machine by a cam 13 on the cam shaft 7. A continuation 14 of the line 10 connects to the solenoid, and from the solenoid through the line 15 returns to the starting box. Obviously, with either the switch 11 or 12 in open position and with only the lines 10, 14 and 15 in use, the solenoid 6 will not be energized.

The clutch slide 8, when moved toward the left, unclutches the spindle from its drive gear. This movement permits the switch 11 to close but the switch 12 in series therewith is normally open, and there will be no flow of current. Now, normally the clutch slide 8 will be moved toward the right at the proper time, so as to clutch the spindle to its drive gear, and such movement to the right will open the switch 11. At a predetermined time, which is preferably just prior to indexing of the machine, the cam 13 closes the switch 12, and if, for any reason, the clutch slide has failed to move toward the right so as to clutch the spindle to its gear, both switches 11 and 12 will be closed and there will be a flow of current through the line 10, switches 11, 12, line 13, thence through solenoid and line 15, and, with the solenoid energized, the core 16 will be moved toward the right and will move the clutch rod 5 with it, so as to disengage the main feed clutch. Such movement of the main feed clutch may be employed for moving a switch 17 to close the circuit through the signal lamp 18, as will be understood, and provide a visual signal that something is wrong with the machine and that the difficulty should be corrected.

Pressure fluid may be employed in the machine, for example, for chucking and unchucking the work, or lubricating oil under pressure may be employed. The machine may be arranged so as to be stopped or for the feed works to be thrown out upon an abnormal pressure condition, such as a falling below a predetermined limit of the pressure of the fluid. In the form shown we employ a switch 19 in the line 20 across the lines 10 and 14. The switch 19 may be actuated by a piston 21 in a cylinder 22 having the pressure fluid connection 23. So long as there is a proper pressure in the line 23 and behind the piston 21, the latter will be moved, say, to its present position and against the spring 24, so as to maintain the switch 19 in open position. Upon a failure of pressure in the line 23 or a reduction of pressure beyond a predetermined limit, the switch 19 will be closed and, as will be evident, the solenoid 6 will be energized and the clutch rod 5 will be moved so as to disengage the feed clutch, as heretofore described. Upon a building up of the pressure so as to open the switch 19, the solenoid will be deenergized and the clutch rod 5 may be manually or otherwise again moved so as to reengage the clutch and cause the machine to function normally.

The machine may be arranged so as to stop before or after each index. The machine may also be arranged so that even though it be set to normally stop before or after each index, by a manual operation, the machine may be caused to fail to stop before or after a particular index. One means for accomplishing the above results may involve the line 25 across the lines 10, 14, and in the line 25 is a normally open switch 26, which is moved to closed position at the desired time, such as just before or just after index, by means of the cam 27 on the cam shaft 7. In the line 25 and in series with the switch 26 is a manually operable switch 28 and, if desired, a second manually operable switch 29. When the switch 28 is open, the machine does not stop at a predetermined point in every cycle, but with the switch 28 (and the switch 29 when provided) closed, as soon as the cam 27 closes the switch 26 the solenoid 6 will be energized, as will be understood, and the main feed clutch will be thrown out. The switch 28 is the one which is normally set by hand for stopping of the machine at a predetermined point in each cycle. However, should it be desired to have the machine continue and not stop during any particular cycle, the switch 28 may be left closed and the switch 29, which is located conveniently to the operator, may be depressed, so as to maintain the circuit line 25 open, even though both switches 26 and 28 may be closed and the solenoid will thus not be energized. The switch 29 or its equivalent is desirable; for example, when an operator is able to chuck a new work piece before the feed clutch is thrown out, he may open the switch 29 and the machine will index or otherwise function normally without stopping. However, should he fail to load a new work piece within the time normally allowed, the switches 29 and 28, both being closed, the switch 26 will be closed by the cam and the feed clutch will be thrown out, as described.

It will be seen that the illustrative safety devices or devices of convenience have been provided in a chucking machine. Others might be provided and the ones illustrated might be used separately or some may be omitted when desired.

The diagram of Fig. 2 is generally similar to Fig. 1, but illustrates specific applications to a bar machine. Some features, however, are applicable to chucking machines as well as other machines. The bar machine is operated in the form shown by the motor M, and, as is usual, there is a main feed clutch which may be engaged and disengaged by movement of the feed clutch rod 35. This rod may be manually actuated in either direction by a suitable handle.

Means have been provided for automatically stopping the machine or throwing out the feed clutch when the stock runs out, or for any reason fails to feed properly, such as upon a slipping of the feed fingers. The stock feed means specifically referred to, and as usually employed, is in the form of a stock feed slide which may be resiliently urged in the stock feeding direction and positively returned by means of a cam. The cam is preferably so arranged as to permit a very substantial feeding movement of the stock feed slide, but under normal conditions, the stock feed slide does not move to the limit permitted by the cam, but its movement is limited by the bar of stock coming into engagement with the usual stock stop. However, should the bar of stock run out, or should the feed fingers slip substantially, the stock feed slide would have an abnormal feeding movement, and means have been provided for then stopping the feed functions preferably with the chuck in open position.

In the form shown, an electric circuit line 36 having a normally open switch 37 therein is in circuit through a line 38 and return line 39, with a solenoid 40 having a core 41 positioned to actuate the feed clutch rod 35 under certain conditions. The stock feed slide 42 is positioned relatively to the normally open switch 37 so that upon an abnormal feeding movement of the stock feed slide, the switch 37 will be thereby closed, but it is to be understood that during normal operation when the stock feed slide feeds the required length of stock up to the stock stop and there is no excessive slippage of feed fingers, the stock feed slide 42 does not move far enough to close the switch 37. However, under abnormal conditions as described, the switch 37 will be closed and the circuit 36, switch 37, line 38, solenoid winding 40, and line 39, will be closed, and the solenoid core 41 will be moved toward the right so as to move the feed clutch rod 35 to disengage the main feed clutch, and the feed functions of the machine will be stopped. Since, under all normal conditions the stock feed slide only moves when the chucking slide 43 has been moved to unchuck the bar of stock and when the main feed clutch is thrown out by an overfeed of the stock feed slide, the chuck will remain open and a new bar of stock may be inserted or the slippage of feed fingers remedied, if a feed finger slippage was the cause of the automatic throw out of the main feed clutch.

If desired, there may be a signal, such as a light 44, in a normally open circuit 45 which may be closed by a switch 46 when the main feed clutch is disengaged. Thus, a signal may be provided to indicate to an operator that the machine has stopped and requires attention.

It is frequently desirable to set the machine to stop at the end of the cycle with the chuck in loading position open, for example, when the operator observes that the stock is about to run out and desires to have the machine stopped as soon as the end of the cycle has been reached. We may provide a line 47 having a normally open switch 48 therein positioned so as to be closed by the chucking slide 43 each time the latter moves so as to unchuck the stock. A continuation 47' of the line 47 embodies a normally open and manually movable switch 48' to close the circuit through the line 38, solenoid winding 40, and line 39, as heretofore described. Thus, when the machine is operating normally but the operator desires to have the machine stopped at the end of the cycle, the switch 48' is manually closed. Thereafter when the chucking slide 43 is moved to unchuck the stock in loading position, the switch 48 will be closed, and it will be clear that the circuit, through line 36, 47, switch 48, line 47', switch 48', line 38, winding 40, and line 39, will be closed, and the solenoid core 41 will again cause the main feed clutch to be disengaged and the chuck will be in open position. A new bar of stock may then be inserted or any other matter attended to. As soon as the switch 48' is again manually opened, the solenoid will be deenergized, and the main feed clutch may again be engaged by hand.

It is also desirable to provide other devices of safety and convenience in the form of automatic means for preventing injury to parts, should the machine fail to clear prior to indexing, for example, if one of the tool slides or a spindle, such as a threading spindle, should fail to move to withdrawn position before indexing. A frequent cause of damage to a machine is the sticking of a tap in the work and a slippage of the threading spindle clutch so as to prevent withdrawal of the threading tool. Indexing of the spindle carrier under such conditions often has a disastrous effect. In the form shown, there is provided a circuit 50 in series with the switch 48 and provided with a normally open switch 51 positioned so as to be closed by a movable part such as a threading spindle 52 when in an inner or threading position. In the particular arrangement shown with the switches 48, 51 in series with each other, it will be clear that the machine is arranged for cutting off in the loading position, and of course prior to unchucking, stock feeding and chucking in the loading position; that is to say, with the arrangement here shown, the bar of stock is unchucked, fed, and again chucked just prior to indexing of the machine. If the threading spindle has not moved back so as to clear the work, the switch 51 remains closed, and as soon as the chucking slide 43 moves so as to unchuck the stock, the switch 48 will be closed and the circuit will be made through the switch 48, switch 51, line 50, line 38, solenoid winding, etc., as heretofore described, and the main feed clutch will be disengaged. Clearly, the switch 48 could be actuated by any part timed to close such switch just prior to indexing; for example, a cam as disclosed in connection with Fig. 1 might be employed to close the switch 48 instead of having the same closed by the chucking slide.

It is desirable to provide a normally open switch 53 in the line 30 and have the same arranged to be closed by a cam 54 on the cam shaft 55 just prior to indexing. With the switch 53 in use it will be clear that the threading spindle or other part 52 need not be retracted prior to the closing of the switch 48 by the chucking slide 43 and it is sufficient if the part 52 is retracted prior to the time of the closing of the switch 53 by the cam 54 which should preferably be just prior to indexing.

A manually operable normally open switch 56 may be placed in the solenoid circuit so that at any time the operator may close the switch 56 and stop the machine or the feed functions thereof.

In the modification shown in Fig. 3 the arrangement is such that the machine is thrown out by a failure of the stock itself to be fed out properly. In the line 36—38 (the same in Figs. 2 and 3) is a normally closed switch 60 in position to be engaged by the stock. Should the stock for any reason fail to engage and open the switch 60 and when the properly timed cam 61 on cam shaft 55 closes the normally open switch 62, the circuit will be made, the solenoid energized, and the machine thrown out as heretofore described.

The modification shown in Fig. 4 is related to a semi-automatic stop device disclosed more in detail in the copending application hereinbefore identified. In that application there is disclosed means for stopping the machine at a predetermined point in the cycle; for example, when the operator notes that the stock is about to run out a manual handle is shifted to set parts so that, upon the next indexing movement, or, in fact, at any predetermined point in the cycle, the machine is stopped. In Fig. 4 similar mechanism is disclosed, and in addition the parts are automatically settable as by means of a solenoid or the like, so that the machine may be thrown out upon an abnormal functioning thereof or as desired.

In Fig. 4 the main cam shaft 70 carries a worm wheel 71, which is driven by a worm 72, and the clutch 73 serves to connect and disconnect the worm 72 from the drive shaft 74. The clutch 73 may be actuated by the shift bar 75, which is in turn moved back and forth by the crank 76 on the oscillatable shaft 77. These clutch-shifting parts may of course be manually actuated, as is usual in machines of this type.

In order to shift the clutch 73 automatically upon an abnormal functioning of the machine we provide a longitudinally displaceable crank arm 78, splined to the shaft 77, so as to oscillate the latter upon a rotative movement of the crank 78. A spring 79 tends to shift the displaceable crank 78 toward the right and against the fixed collar 80. The crank 78 in the form shown is shifted in the opposite direction, that is, away from the collar 80 by means of the core 81 of a solenoid. The solenoid may be put in circuit by suitable switch devices, for example, as heretofore described in connection with Figs. 1, 2 and 3.

A lever 82 is pivotally carried by the frame of the machine and is urged by a spring, as shown, in a clockwise direction. One end of the lever carries a roll 83, engageable by one or more cam dogs 84, suitably placed on a main cam shaft 70 and preferably adjustable circumferentially thereof, so as to cause rocking of the lever 82 at predetermined points in the cycle of the cam shaft desired. The opposite end of the lever 82 has a nose 85, in position to engage the nose 86 on the shiftable crank 78 when the latter is shifted, so as to be positioned beneath the nose 85 of the lever 82. During the normal operation of the machine the shiftable crank 78 is held against the collar 80, so that the parts 85, 86 do not contact with each other during rocking of the lever 82. Whenever the solenoid is energized, due to any of the causes heretofore enumerated in connection with Figs. 1, 2 or 3, or for any other reason, the core 81 is moved to the right so as to position the end 86 on the shiftable lever 78 directly beneath the nose 85 on the lever 82. When the lever 82 is again shifted by one of the cams 84, the shiftable crank 78 and the shaft 77 will be rocked in a clockwise direction as viewed in Fig. 4, so as to throw out the clutch 73 to stop the rotation of the feed works. When the cause occasioning the energizing of the solenoid is remedied, the spring 79 shifts the shiftable lever 78 out of the way of the nose 85, and the feed clutch 73 may then be thrown in manually or otherwise, so as to again cause the machine to feed and function normally.

In that form of the invention shown in Fig. 5 we employ fluid under pressure, for example, oil. In place of the solenoids heretofore described in connection with Figs. 1 and 2 we employ a piston 90, which may be hydraulically actuated in a right-hand direction, to move the clutch rod 91, corresponding with the clutch rods 5, 35 and 75, or other means such as the shiftable lever 78, heretofore described. The pressure fluid is furnished by a pump 92 and passes through pipes corresponding in general to the electric circuits heretofore noted. For example, the valve 56ª is a hand-operated valve and may be turned so as to admit pressure fluid to the piston 90, so as to throw out the machine by hand, as desired. With the valve 56ª closed the piston 90 may be actuated by fluid pressure through one of the other lines and held in the right-hand or actuated position. The hand valve 56ª may be turned by hand, so as to exhaust pressure fluid from the piston 90 and permit fluid to pass out through the exhaust passage centrally of the valve. The valve 37ª corresponds to the electric switch 37 of Fig. 2 and is under the control of the stock feed slide. The valve 37ª is normally closed but is opened by the stock feed slide under abnormal conditions, as heretofore described in connection with Fig. 2, so as to permit the passage of pressure fluid from the pump to the piston 90. The valve 48ª corresponds to the switch 48 of Fig. 2 and is controlled by the chucking slide. The valve 48ª' corresponds to the manually actuated switch 48' of Fig. 2. The valve 51ª, controlled by the threading spindle, corresponds to the switch 51 of Fig. 2, also controlled by the threading spindle. Thus, in situations where it may be more convenient to employ pressure fluid rather than electrical means, the devices of safety and convenience heretofore described may be actuated by fluid under pressure.

In the modification shown in Fig. 6 wholly mechanical means are provided for throwing out the feed works. In that form of the invention the main cam shaft 100 is rotated by means of the worm wheel 101 and worm 102, carrying clutch parts 103, 104. The clutch part 103 is driven by the rotating clutch cone 104, which may be shifted by a longitudinally slidable rod 107. The worm shaft carries a clutch cone 108, engageable with a clutch part 109, carried by a shiftable stub shaft 110. The shaft 110 has an arm or crank 111 fixed thereto and carries the cam 112, engageable with the end of the rod 107, so that when the crank arm 111 is rotated the rod 107 will be cammed toward the right, so as to disengage the clutch parts 103, 104. The shiftable shaft 110 may be moved so as to engage the clutch parts 108, 109 by means of the stock feed slide 42ᵇ, corresponding to the stock feed slide 42 heretofore described. Thus, upon an abnormal feed of the stock feed slide the clutch parts 108, 109 would be engaged with each other and the machine would be thrown out.

In the modification shown in Fig. 7 the shaft 110 is actuated by the solenoid 120, which may correspond with and be energized by the same means and for the same causes for which the solenoids heretofore described are energized. In other respects the mechanism of Fig. 7 may be the same as that shown in Fig. 6.

Both the chucking machine and the bar machine herein referred to are so arranged that when the cause for throwing out of the feed clutch has been removed, the feed clutch is free to be reengaged and is preferably reengageable by hand.

Obviously, relays could be employed in the circuits shown, but for simplicity of illustration, such relays have been omitted. While applications to a chucking machine and to a bar machine have been shown, it will be understood that some features shown in one may be employed in the other, and that features of the invention are applicable to other types of machines.

In the particular embodiments shown, only preferred forms have been illustrated and typical examples given. Many other applications of the invention and various embodiments and arrangements, within the scope of the invention, will suggest themselves to those skilled in the art.

We claim:

1. In a machine of the character indicated, a drive shaft, a main feed clutch for driving said shaft, a rotatable spindle, means actuated by said drive shaft for starting and stopping the same, and electrical means including a switch controlled by said spindle starting and stopping means, and a motor means controlled by said switch for disengaging said main feed clutch upon a failure of said spindle starting and stopping means to act at the predetermined time.

2. In a machine of the character indicated, a main feed clutch, electrical means for actuating said main feed clutch, a pressure switch controlling the circuit of said electrical means, means for supplying pressure to said pressure switch to maintain the same in predetermined position, said switch being operable to actuate said electrical means upon a change of pressure to said switch beyond a predetermined limit.

3. In a machine of the character indicated, a main feed clutch, electrical means for actuating said main feed clutch and including a pressure switch for controlling said electrical means and operable to cause said main feed clutch to be disengaged upon a drop of pressure below a predetermined limit.

4. In a machine of the character indicated, a main feed clutch, a spindle, a spindle clutch, a spindle carrier for said spindle, electrical means including a pair of switches in series, whereby when both of said switches are closed, said main feed clutch will be disengaged, one of said switches being movable to open position when said spindle clutch is engaged so as to rotate said spindle, and means for closing the other of said switches at a predetermined point in the cycle of said spindle carrier.

5. In a machine of the character indicated, a main feed clutch, a threading spindle, and electrical means for actuating said main feed clutch, said electrical means including a switch operable by said spindle at a predetermined point in its travel, and a second switch operable by a machine part independently of said spindle.

6. In a machine of the character indicated, an indexible carrier, indexing means therefor, a tool, a main feed clutch, and means controlled conjointly by the position of said tool and said indexing means for disengaging said main feed clutch upon a failure of said tool to be positioned in withdrawn position just prior to the time for indexing of said carrier by said indexing means.

7. In a machine of the character indicated, a main feed clutch, a chucking device, a chucking slide for actuating said chucking device, electrical means for actuating said main feed clutch, a manually operable switch in circuit with said electrical means, and a second switch controlled by said chucking slide for controlling the circuit through said manually operable switch for disengaging said main feed clutch.

8. In a machine of the character indicated, a main feed clutch, a spindle, chucking means therefor movable in a chucking and an unchucking direction, and electrical means controllable by said chucking means and operable upon movement of said chucking means in an unchucking direction to disengage said feed clutch.

9. In a machine of the character indicated, a main feed clutch, a solenoid for actuating the same, a solenoid circuit, a rotatable spindle, a stock feed slide and a chucking slide, a resilient means for moving said stock feed slide in feeding direction, cam means for returning said stock feed slide, a stock stop for limiting the movement of stock in the feeding direction, and a switch operable upon an abnormal movement of said stock feed slide in the feeding direction and located in the circuit of said solenoid for controlling said circuit, whereby said main feed clutch will be disengaged.

10. In a machine of the character indicated, a main feed clutch, electrical means for disengaging said clutch, and circuit means for controlling said electrical means and including a switch, together with means for periodically actuating the same during each cycle of the machine, and a second switch in series with said first mentioned switch, together with means for operating said second switch upon an abnormal functioning of the machine whereby said clutch will be disengaged by said electrical means.

11. In a machine of the character indicated, a main feed clutch, means for disengaging the same including electric circuit means, a switch therein operable periodically by a machine part during a cycle of the machine, and a manually operable switch in series with said first switch whereby when said manually operable switch is actuated said electrical means will be rendered operative upon the actuation of said machine actuable switch to disengage said main feed clutch.

12. In a machine of the character indicated, a main feed clutch, means for disengaging the same comprising a mechanically actuable member actuated by a machine drive means periodically during a machine cycle and a second member cooperable therewith and movable into operative and inoperative positions, together with electrical means for moving said second member into operative position whereby said clutch will be disengaged.

13. In a machine of the character indicated, a main feed clutch, a member for disengaging the same, and means for actuating said member to disengage said main feed clutch comprising a second clutch, and means for actuating said second clutch upon an abnormal functioning of said machine whereby said second clutch will be engaged for actuating said member to disengage said main feed clutch.

DONALD H. MONTGOMERY.
WILLIAM B. RETZ.